United States Patent [19]
Losch

[11] 4,119,834
[45] Oct. 10, 1978

[54] ELECTRICAL RADIANT HEAT FOOD WARMER AND ORGANIZER

[75] Inventor: E. R. Losch, Harrisburg, Pa.
[73] Assignee: Joseph D. Losch, Longwood, Fla.
[21] Appl. No.: 708,208
[22] Filed: Jul. 23, 1976
[51] Int. Cl.² .......................... H05B 1/02; A47J 36/24; A47B 11/00; A47F 5/05
[52] U.S. Cl. ........................ 219/354; 108/23; 108/94; 211/131; 219/214; 219/218; 219/220; 219/358; 219/518; 219/521
[58] Field of Search ........ 219/339, 340, 342, 347–358, 219/218, 220, 405, 411, 518, 552, 521, 201, 214; 211/78, 131, 129; 108/94, 23

[56] References Cited
U.S. PATENT DOCUMENTS

| | | | |
|---|---|---|---|
| 1,945,196 | 1/1934 | Kelly | 219/346 |
| 2,261,514 | 11/1941 | Dumigan | 219/218 |
| 2,672,741 | 3/1954 | Bernhardt | 211/78 X |
| 2,738,410 | 3/1956 | Ness et al. | 219/356 |
| 2,863,979 | 12/1958 | Fitzgerald | 219/347 X |
| 3,586,823 | 6/1971 | Schier | 219/214 X |
| 4,003,471 | 1/1977 | Alfano | 211/129 |

FOREIGN PATENT DOCUMENTS
869,503  5/1961  United Kingdom ..................... 219/340

*Primary Examiner*—A. Bartis
*Attorney, Agent, or Firm*—Sherman & Shalloway

[57] ABSTRACT

A food warmer includes a plurality of trays and associated lamps mounted on a frame for rotation in unison about a stationary standard. Each lamp is arranged above each respective tray to project heat downwardly only into the tray with which it is associated. The trays are pivotally supported on the frame and a switch associated with each tray is closed by pivotal movement of the tray upon placement of food on the tray to energize the lamp associated with the tray. A rotary connector is disposed between standard and frame, so that current can be supplied to each lamp regardless of the rotary position thereof. Each tray is detachable from the frame for cleaning and a switch override is selectively disposed between the tray and housing to prevent closing of the switch and energization of the lamp when necessary.

8 Claims, 7 Drawing Figures

ELECTRICAL RADIANT HEAT FOOD WARMER AND ORGANIZER

BACKGROUND OF THE INVENTION

1. Field of the Invention

This invention relates to food warmers. More particularly, this invention relates to food warmers, which are selectively operable.

2. Technical Considerations and Prior Art

In restaurants, waiters often serve several tables at once. Consequently, food often sits after it has been prepared, while the waiters take and fulfill other orders. It is, therefore, desirable to keep the food warm until the waiter gets around to serving it.

In many restaurants, this is accomplished by a bank of infrared lamps, which remain on even when no food is being warmed. Consequently, there is a large waste of heat energy, which is added to the already elevated kitchen temperature, and which in warm weather adds to the airconditioning burden. In addition, cold foods, such as ice cream and salads cannot be placed beneath the lamps, so that additional shelf space for cold food must be provided. There are other problems with the current approach in that the food is not organized in a way so as to avoid conflicts in food orders and intentional and unintentional taking of food orders placed by other waiters.

U.S. Pat. Nos. 2,738,410; 3,244,859; and 3,586,824 disclose heating appliances, which are operated upon placing food in position to be heated. These appliances, however, do not solve all of the aforementioned problems.

While the aforementioned problems are especially acute in restaurants, the problems also can arise in the home, where there is a need to keep food warm before and during a meal. For example, it may be desirable to keep serving dishes warm or served plates warm.

OBJECTS OF THE INVENTION

In view of the aforementioned problems and other problems, it is an object of the instant invention to provide a new and improved appliance for warming food.

It is a further object of the invention to provide a new and improved appliance for warming food, wherein the appliance is energized only when the food is present.

It is still another object of the invention to provide a new and improved appliance for warming food, wherein the appliance has a plurality of heaters and associated food warming stations.

It is a further object of the instant invention to provide a new and improved appliance for warming food, wherein the appliance utilizes space efficiently.

It is a further object of the instant invention to provide a new and improved appliance for warming food, wherein food may be placed on the appliance, while the heater is deactivated, so that the appliance may be used without warming the food desired.

It is still a further object of the instant invention to provide a new and improved appliance for warming food, wherein the appliance may be easily cleaned.

It is an additional object of the instant invention to provide a new and improved appliance for warming food, which materially improves restaurant efficiency and service.

SUMMARY OF THE INVENTION

In view of these and other objects, the instant invention contemplates an appliance for applying heat to food, wherein a plurality of heating members are attached to a frame which is, in turn, rotatably supported on a standard projecting up from a base. With each heating member, there is associated a tray for carrying the food to be kept warm by the heating member. Means are provided to energize each heating member separately upon placing food on the tray, so that heating members are not unnecessarily energized. The standard carries a rotary connection for continuously supplying energy to each heating member, regardless of the rotary position of the heating member, as long as there is food on the tray. In a preferred embodiment, each tray is removable from the frame for washing.

DETAILED DESCRIPTION

Figure 1:
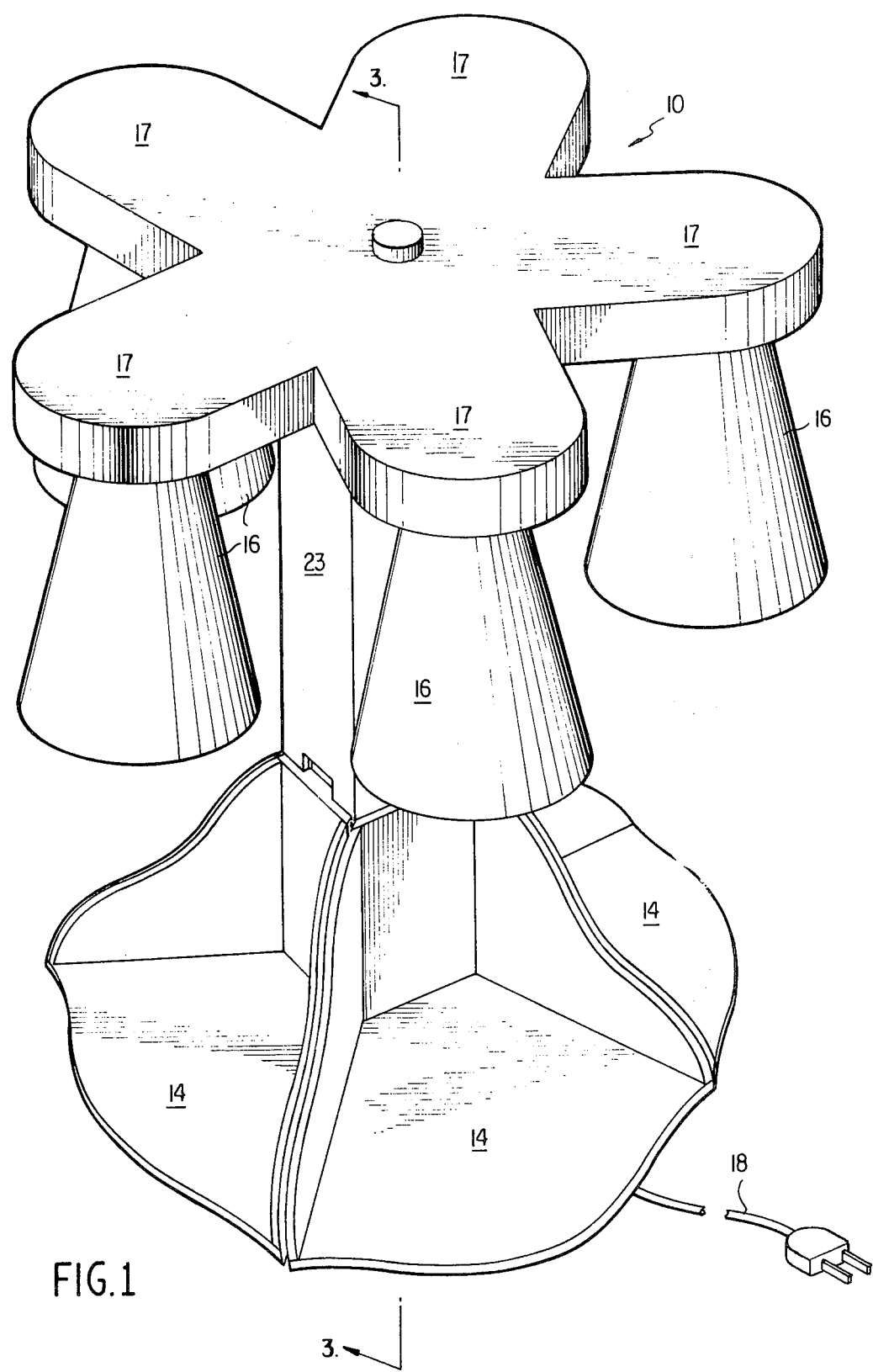
FIG. 1 is a perspective view of the appliance, according to the instant invention.
Figure 2:
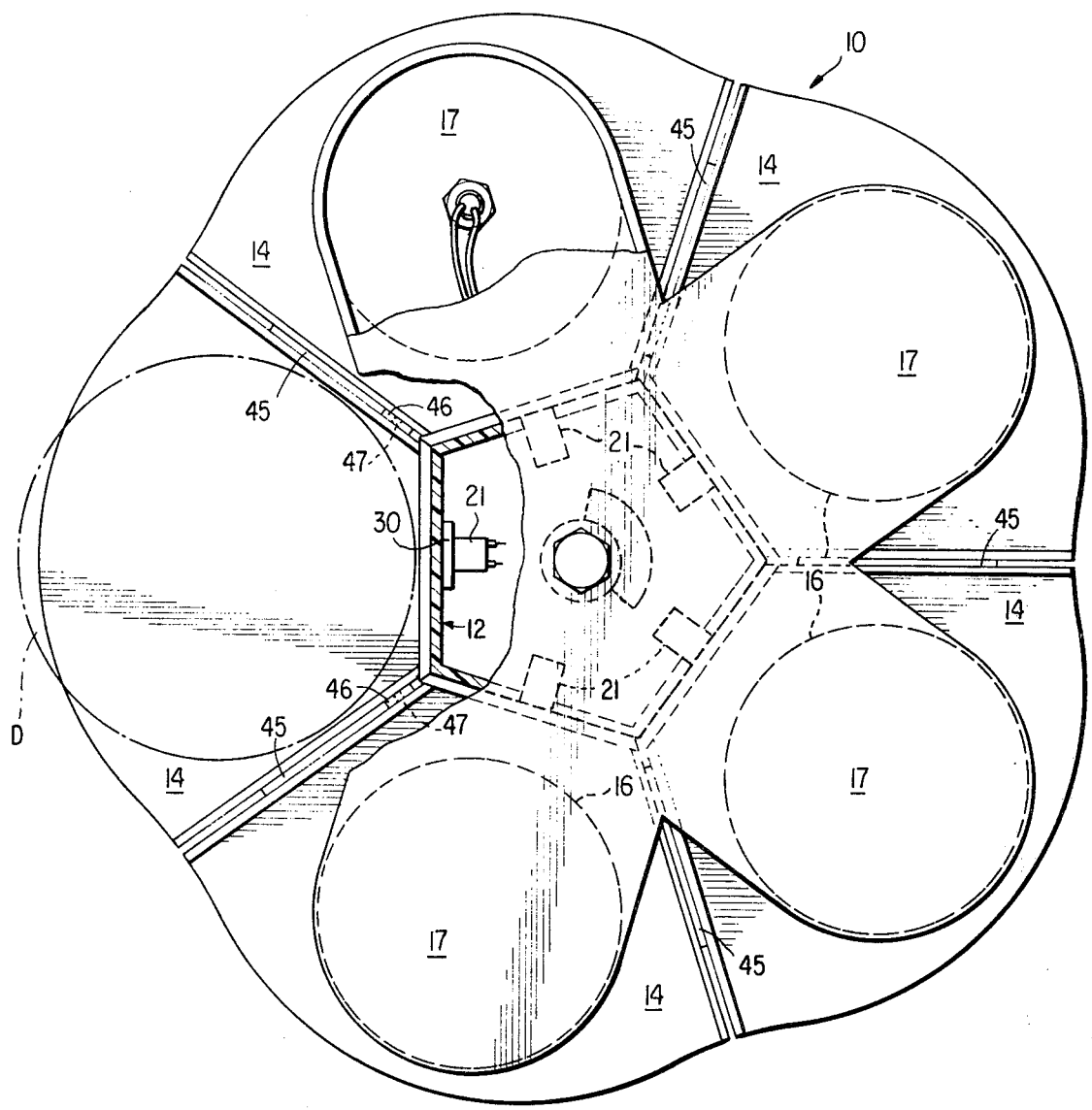
FIG. 2 is a top view with parts broken away to render other parts visible of the appliance, shown in FIG. 1
Figure 3:
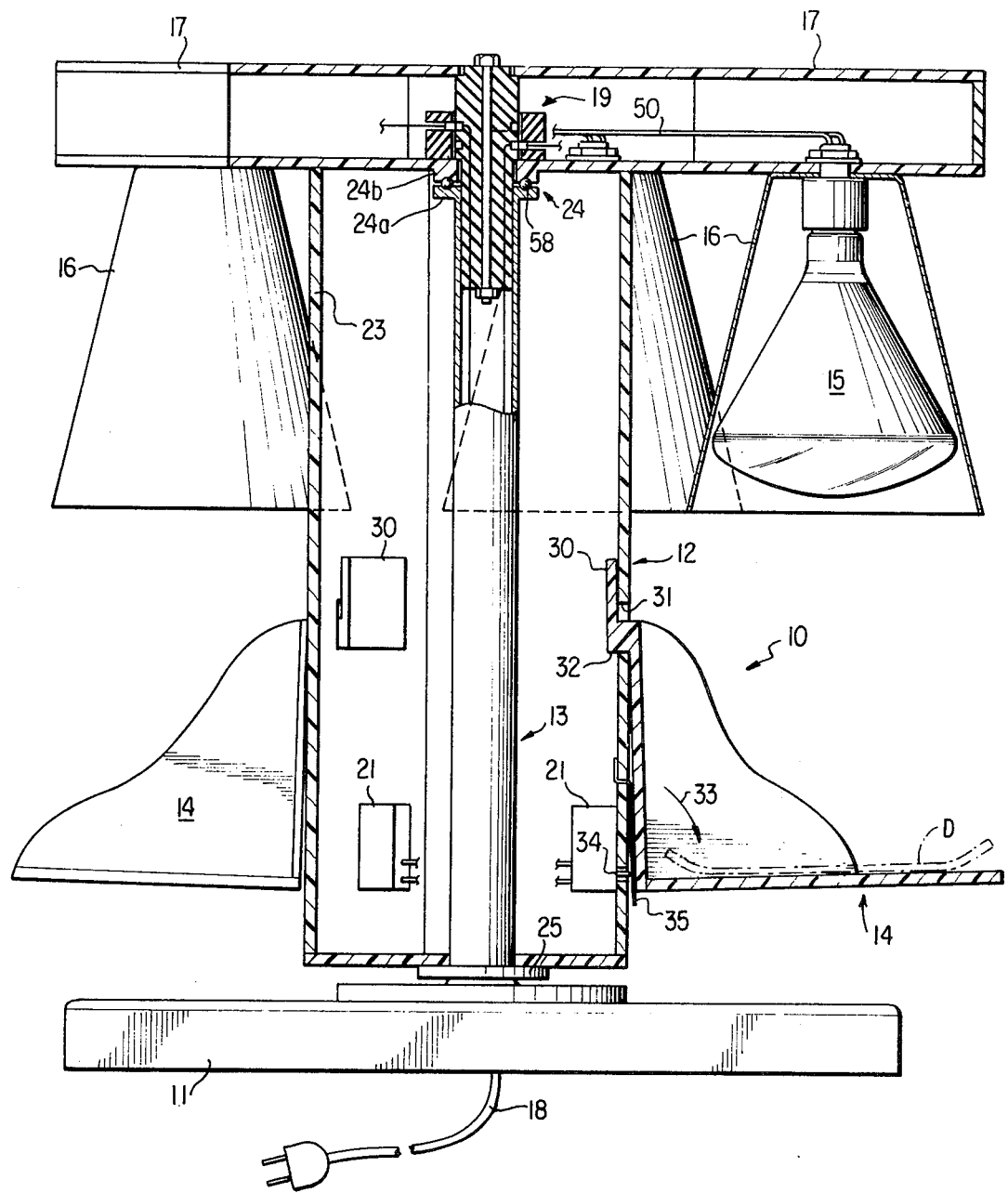
FIG. 3 is a side view, partially in section, showing details of the appliance assembly.

Referring now to FIGS. 1, 2 and 3, there is shown a food warmer, designated generally by the numeral 10. The food warmer 10 includes a base 11, which rests on a counter top, or the like and a frame, designated generally by the numeral 12, which is rotatably mounted on a standard 13 that projects from the base. A plurality of trays 14 are detachably mounted on the frame 12 for rotation therewith. Above each tray is positioned an infrared lamp 15 enclosed in a shield 16, and mounted on arms 17, which form part of the supporting frame. The infrared lamps are connected to a power line 18 through a rotary connector, designated generally by the numeral 19, so that the lamps 15 may be energized at any angular position, with respect to the base 11. Each tray 14 has a switch 21 associated therewith, which when closed allows current to flow to the associated lamp 15. The switches 21 are closed by placing food on the trays 14.

By using the aforedescribed structure in a restaurant to heat food, space will be conserved, because the trays 14 will rotate, so that food placed on the trays 14 when served from the kitchen can be rotated around to the other side of a counter for delivery to a waiter or waitress. Since the structure is freely rotatable, the waiter or waitress simply rotates the frame 12 relative to the base 11 to bring the order around. Since the infrared lamps 15 are not energized unless there is an order on a tray 14, a great deal of energy is saved and wasted heat is not released into the restaurant.

Referring now to the details of the aforedescribed structure, the frame 12 is preferably made of plastic and consists of a housing portion 23, which surrounds the standard 13, and is supported on the standard 13 by a thrust bearing 24. Preferably, the housing 23 is stabilized at its bottom by a bushing 25, which surrounds the standard 13. The arms 17, which projects radially from the housing 23 are preferably hollow, so as to accommodate wiring for the lamps 15.

Figure 6:
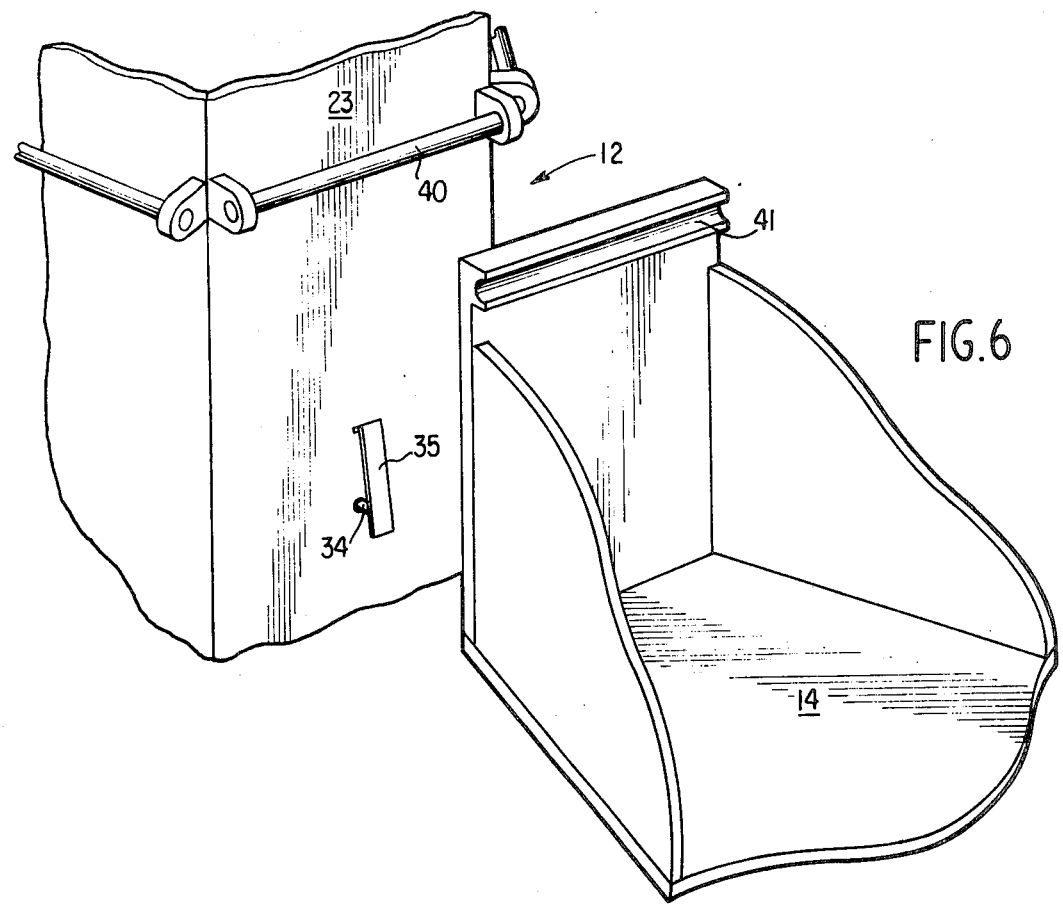
FIG. 6 is a perspective view of an alternative embodiment for coupling a tray to the supporting frame.
Figure 5:
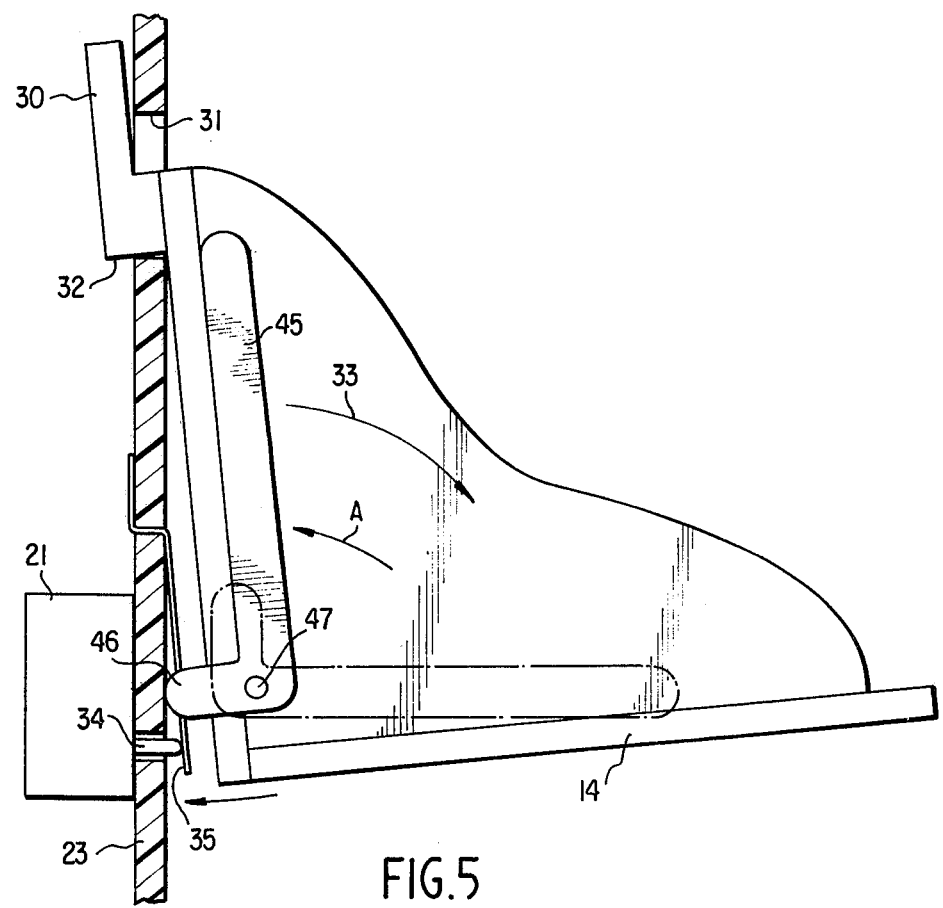
FIG. 5 is a side view showing one embodiment of a coupling between a tray and supporting frame including a switch override.

The trays 14 are pivotally mounted to the side of the housing 23. This may be accomplished in any convenient fashion, examples of which are shown in FIGS. 3, 5 and 6. In the embodiments of FIGS. 3 and 5, each tray has a projecting lip 30, which fits into a slot 31 in the side of the housing. The projecting lip 30 has a shoulder 32 on the bottom thereof, which rests on the bottom of the slot 31. The tray 14 is mounted on the housing 23 by sliding the lip 30 into the slot 31, so that the tray is pivotally mounted by the shoulder 32 on the bottom slot 31. When food in a dish D, such as shown in phantom line in FIGS. 2 and 3, is placed on the tray 14, it causes the tray to rotate in the clockwise direction of arrow 33, so as to press against an activating pin 34 of the switch 21 to close the switch 21. When there is no food on the tray 14, the tray does not press against the activating pin with sufficient force to close the switch. In the disclosed embodiments, a spring 35 is used to bias the tray 14 away from the activating pin.

In the embodiment shown in FIG. 6, the housing 23 has a bar 40 mounted in spaced relation relative thereto, which receives a slot 41 of the tray 14, so that the tray 14 is rotatably mounted with respect to the housing 23. Upon placing food on the tray 14, the tray 14 is pressed against the spring 35 and the activating pin 34 to close the switch 21 and energize the lamp 15.

Referring now specifically to FIG. 5, it is not desirable to heat food orders such as salad and ice cream, and yet it is desirable to use the structure of the food warmer 10 to fill orders. When it is not desired to heat the order, the lamps 15 may be prevented from being turned on by using a deactivating lever 45 located on the outside of the side wall of the tray. The lever 45 is rotated in the counterclockwise direction of arrow A to hold the tray 14 spaced from the housing 23, so that the tray 14 cannot engage the activating pin 34. In order to accomplish this, the lever 45 has a projection 46 thereon, which extends between the tray 14 and the housing 23 when the lever is employed. The lever is preferably mounted at the side of the tray 14 on a pivot 47.

Figure 4:
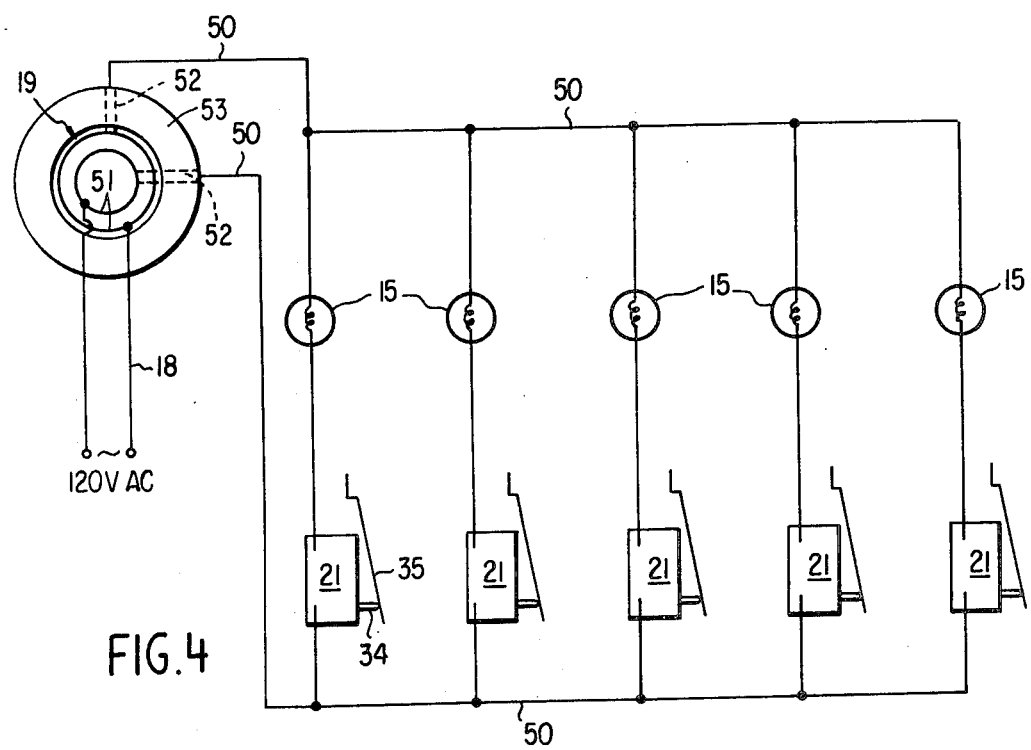
FIG. 4 is a circuit diagram showing the connections between a plurality of heating lamps and their associated switches.

Referring now to FIG. 4, there is shown schematically a circuit for energizing the infrared lamps 15 which are arranged in parallel between lines 50 that are connected to the rotary connector 19. In series, with each infrared lamp 15, is a switch 21 which, when closed, energizes the infrared lamp.

Figure 7:
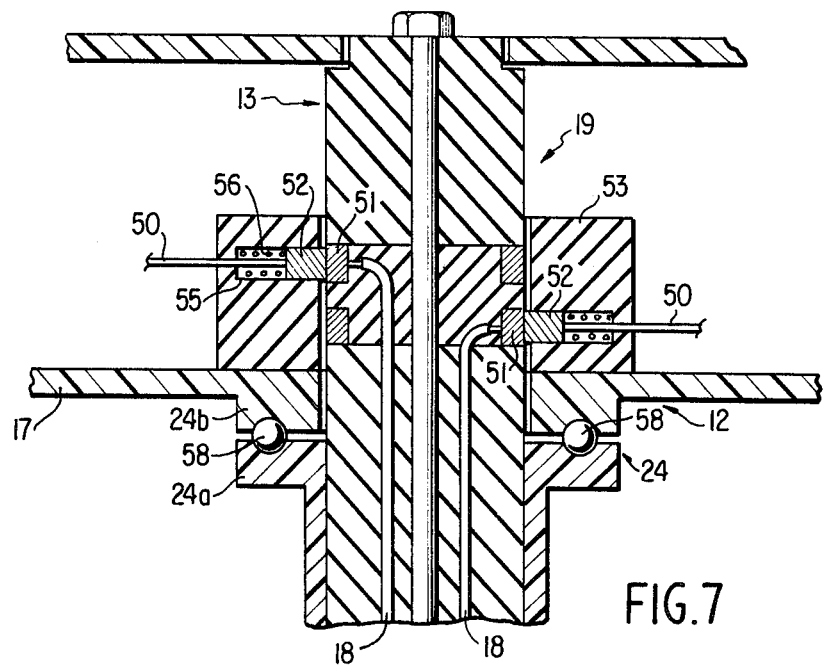
FIG. 7 is a side view in section showing details of a rotary connector.

The rotary connector 19, which is best seen in FIG. 7, connects the power line 18 to the lines 50 through rings 51 which engage brushes 52 connected to the lines 50. The brushes 52 are mounted in a rotary bushing 53, which rotates with the arms 17, as the frame 12 rotates. Preferably, the brushes 52 are mounted in bores 55 in the bushings 53 and are projected by springs 56. The thrust bearing 24 has two races 24a and 24b. Race 24a is rigidly associated with the standard 13 and race 24b is rigidly associated with the arms 17 and the frame 12. Ball bearings 58, disposed between the races 24a and 24b support the frame 12, so that the frame 12 will rotate about the standard 13. The brushes 52, are continuously engaged with the rings 51, so that power is available for each of the infrared lamp 15 regardless of the rotary position of the frame 12, with respect to the base 11.

In summary, the above structure provides a new and improved food warmer, in which the trays 14 activate heat lamps 15 only when food is in place on the trays. In addition, the trays 14 can be readily removed from the housing 23 for cleaning. Finally, the trays are provided with a diactivating lever 45 to selectively override the switches 21, so that the lamps 15 are not lighted when food is on the trays 14.

The aforedescribed embodiment and embodiments of the invention are for purposes of illustration only, and the invention is only to be limited by the following appended claims.

What is claimed is:

1. An appliance for warming food comprising:
a base for resting on a surface;
a frame;
means for supporting said frame to rotate about a vertical axis with respect to said base;
a plurality of trays rotatable with said frame and supported at an upper end thereof by said frame for pivotable movement with respect to said frame;
a plurality of heating means mounted on said frame above said trays to warm food placed on said trays, one of said heating being means arranged above each respective tray to project heat downwardly only to the tray with which it is associated, said heating means being arranged to rotate in unison with the frame so that each of the heating means is always in registry with its respective tray;
switch means associated with each of said trays and carried by the frame, said switch means positioned for engagement by the tray for activating said heating means associated with the respective tray in response to pivotal movement of the tray relative to the frame from placement of food on the tray; and
connector means for supplying energy to each of said heating means regardless of the rotary position of said heating means with respect to said base.

2. A food warmer, according to claim 1, wherein said connector means includes a rotary connector disposed between said frame and said base.

3. The appliance of claim 2, further including a standard fixed to said base, wherein said standard includes one half of said rotary connector and wherein said frame is rotatably supported on said standard and includes the second half of said rotary connector.

4. The food warming appliance of claim 3, wherein said frame is disposed about said standard, and wherein the trays are detachable from said frame.

5. The food warming appliance of claim 3, wherein the heating means is an individual infrared lamp associated with each tray.

6. The food warming appliance of claim 5, wherein the lamps are connected in parallel to lines from the rotary connector and wherein said switch means is an individual switch in series with each lamp.

7. The food warmer of claim 6, wherein each tray includes means thereon to prevent the pivotal movement of the tray from closing the switch associated therewith.

8. The food warmer of claim 1, wherein means are provided on each tray for selective positioning between the tray and said frame to prevent the tray from engaging said switch, so as not to activate said switch and energize said heater when food is placed upon the tray.

* * * * *

UNITED STATES PATENT AND TRADEMARK OFFICE
CERTIFICATE OF CORRECTION

PATENT NO. : 4,119,834
DATED : October 10, 1978
INVENTOR(S) : E. R. Losch

It is certified that error appears in the above-identified patent and that said Letters Patent are hereby corrected as shown below:

Claim 4, line 52, after "are" insert -- individually --.

Claim 4, line 52, after "detachable" insert -- and removable --.

Signed and Sealed this

Twenty-sixth Day of December 1978

[SEAL]

Attest:

RUTH C. MASON
Attesting Officer

DONALD W. BANNER
Commissioner of Patents and Trademarks